United States Patent
Singh et al.

(10) Patent No.: US 12,008,071 B2
(45) Date of Patent: Jun. 11, 2024

(54) SYSTEM AND METHOD FOR PARAMETER COMPRESSION OF CAPSULE NETWORKS USING DEEP FEATURES

(71) Applicant: Tata Consultancy Services Limited, Mumbai (IN)

(72) Inventors: Chandan Kumar Singh, Noida (IN); Vivek Kumar Gangwar, Noida (IN); Anima Majumder, Bangalore (IN); Prakash Chanderlal Ambwani, Noida (IN); Rajesh Sinha, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 245 days.

(21) Appl. No.: 17/377,628

(22) Filed: Jul. 16, 2021

(65) Prior Publication Data
US 2022/0044065 A1 Feb. 10, 2022

(30) Foreign Application Priority Data
Jul. 17, 2020 (IN) .............................. 202021030618

(51) Int. Cl.
*G06N 3/045* (2023.01)
*G06F 18/21* (2023.01)
(Continued)

(52) U.S. Cl.
CPC .......... *G06F 18/21* (2023.01); *G06F 18/2431* (2023.01); *G06N 3/08* (2013.01); *G06V 10/40* (2022.01)

(58) Field of Classification Search
CPC ....... G06F 18/21; G06F 18/2431; G06N 3/08; G06N 3/045; G06N 3/088; G06V 10/40; G06V 10/454
See application file for complete search history.

(56) References Cited

U.S. PATENT DOCUMENTS

2021/0374504 A1* 12/2021 Kurasawa .............. G06N 3/048

FOREIGN PATENT DOCUMENTS

CN    110657984 B    6/2020
CN    111241958 A    6/2020

OTHER PUBLICATIONS

Hinton, Geoffrey E., Sara Sabour, and Nicholas Frosst. "Matrix capsules with EM routing." International conference on learning representations. 2018.https://openreview.net/forum?id=HJWLfGWRb (Year: 2018).*

(Continued)

*Primary Examiner* — John Villecco
*Assistant Examiner* — Han Hoang
(74) *Attorney, Agent, or Firm* — FINNEGAN, HENDERSON, FARABOW, GARRETT & DUNNER LLP

(57) ABSTRACT

This disclosure relates generally to system and method for parameter compression of capsule networks using deep features. The conventional capsule networks have distinct capability of retaining spatial correlations between extracted features but that comes at a cost of intensive computational, cost, memory usage and bandwidth requirement. The embodiments herein disclose a system and method for employing a lightweight deep features based capsule network that is capable of compressing the parameters. In an embodiment, the system includes a deep feature based capsule network such that the capsule layer is preceded by feature blocks. Said feature blocks comprises convolutional operation with a kernel size 3, followed by convolutional operation with kernel of size 1, and a Batch Normalization layer, and hence are able to extract deep features. These deep features when input to the capsule layer facilitates in compressing the parameters of the capsule layer, while ensuring significant increase in recognition accuracy.

7 Claims, 9 Drawing Sheets

(51) Int. Cl.
  *G06F 18/2431* (2023.01)
  *G06N 3/08* (2023.01)
  *G06V 10/40* (2022.01)

(56) References Cited

OTHER PUBLICATIONS

Jia, Bohan, and Qiyu Huang. "DE-CapsNet: A diverse enhanced capsule network with disperse dynamic routing." Applied Sciences 10.3 (2020): 884.https://www.mdpi.com/2076-3417/10/3/884 (Year: 2020).*

Ioffe, Sergey, and Christian Szegedy. "Batch normalization: Accelerating deep network training by reducing internal covariate shift." International conference on machine learning. pmlr, 2015.https://arxiv.org/abs/1502.03167 (Year: 2015).*

Gregor, Karol, et al. "Draw: A recurrent neural network for image generation." International conference on machine learning. PMLR, 2015.https://arxiv.org/abs/1502.04623 (Year: 2015).*

Xiang, Canqun, et al. "MS-CapsNet: A novel multi-scale capsule network." IEEE Signal Processing Letters 25.12 (2018): 1850-1854 .https://ieeexplore.ieee.org/abstract/document/8481393 (Year: 2018).*

Jia et al, "DE-CapsNet: A Diverse Enhanced Capsule Network with Disperse Dynamic Routing," Appl. Sci. 10(3) (2020).

Rajasegaran et al., "DeepCaps: Going Deeper with Capsule Networks," (2019).

Yang et al., "RS-CapsNet: An Advanced Capsule Network," IEEE Access, 8:85007-85018 (2020).

\* cited by examiner

SYSTEM AND METHOD FOR PARAMETER COMPRESSION OF CAPSULE NETWORKS USING DEEP FEATURES

PRIORITY CLAIM

This U.S. patent application claims priority under 35 U.S.C. § 119 to: India Application No. 202021030618, filed on Jul. 17, 2020. The entire contents of the aforementioned application are incorporated herein by reference.

TECHNICAL FIELD

The disclosure herein generally relates to capsule networks, and, more particularly, to a system and a method for parameter compression of capsule networks using deep features.

BACKGROUND

Various vision-based algorithms are utilized for automatic recognition of real-world objects in various applications including, but not limited to, object detection, text recognition, and so on. The currently available vision-based algorithms utilize data driven learning techniques and/or architectures including convolutional neural networks (CNNs). Though the result of recognition (for example, object recognition) using such techniques have shown immense performance on large-scale object datasets, they suffer with some major drawbacks.

The CNNs by nature employ invariance of features against their spatial position. The main reason for such behavior lies in the use of the pooling technique such as a max pooling operation. The max pooling operation only keeps the information if an edge is present and throws away the rest; which may also include the location and the spatial relationships between certain features. Or in other words, the CNNs with max pooling do not retain any internal representation of the geometrical constraints present in the data. In addition, the CNNs have to be trained with a large amount of labeled data. For example, in order to be able to efficiently detect a cat at any given viewpoint, we need to have a set of training images containing all different possible viewpoints of the cat as the network does not encode the prior knowledge of the geometrical relationships.

To overcome the aforementioned limitations of the CNNs, a deep network known as capsule network was introduced. The capsule networks are shown to provide good results for image classification, with high recognition on certain known datasets. The training process of the existing capsule network is very slow due to inner loop and high computational parameter requirements, which restricts the network from using it for wider and more complex applications.

SUMMARY

Embodiments of the present disclosure present technological improvements as solutions to one or more of the above-mentioned technical problems recognized by the inventors in conventional systems. For example, in one embodiment, a method for parameter compression of Capsule networks using deep features is provided. The processor implemented method includes employing a deep feature based Capsule Network for a task, via one or more hardware processors, the deep feature based Capsule Network comprising a feature extraction layer comprising a set of feature extraction units wherein each feature extraction unit comprises 3×3 convolutional operation with a kernel size 3, followed by convolutional operation with a kernel of size 1, and a batch normalization (BN) layer, a primary capsule layer comprising a set of primary Capsules, and a class capsule layer comprising a set of class capsules. Employing the deep feature based Capsule Network for the task comprises passing, successively through each of the set of feature extraction units, an input data to obtain set of input feature vectors, performing, by the primary capsule layer, a convolution of the set of input feature vectors into the set of primary capsules, wherein the set of primary capsules in the primary capsule layer comprises an optimal number of capsules based on a number of deep features in the set of deep features; and predicting, at the class capsule layer, a set of classes from the set of input feature vectors, wherein a number of capsules in the set of class capsules is equal to a number of classes associated with the task.

In another aspect, a system for parameter compression of Capsule networks using deep features is provided. The method includes The system includes one or more memories; and one or more hardware processors, the one or more memories coupled to the one or more hardware processors, wherein the one or more hardware processors are configured to execute programmed instructions stored in the one or more memories to employ a deep feature based Capsule Network for a task. The deep feature based Capsule Network includes a feature extraction layer comprising a set of feature extraction units wherein each feature extraction unit comprises convolutional operation with a kernel size 3, followed by convolutional operation with a kernel of size 1, and a batch normalization (BN) layer, a primary capsule layer comprising a set of primary Capsules, and a class capsule layer comprising a set of class capsules. To employ the deep feature based Capsule Network for the task, the one or more hardware processors are configured by the instructions to pass, successively through each of the set of feature extraction units, an input data to obtain set of input feature vectors, perform, by the primary capsule layer, a convolution of the set of input feature vectors into the set of primary capsules, wherein the set of primary capsules in the primary capsule layer comprises an optimal number of capsules based on a number of deep features in the set of deep features; and predict, at the class capsule layer, a set of classes from the set of input feature vectors, wherein a number of capsules in the set of class capsules is equal to a number of classes associated with the task.

In yet another aspect, a non-transitory computer readable medium for a method for parameter compression of Capsule networks using deep features is provided. The processor implemented method includes employing a deep feature based Capsule Network for a task, via one or more hardware processors, the deep feature based Capsule Network comprising a feature extraction layer comprising a set of feature extraction units wherein each feature extraction unit comprises convolutional operation with a kernel size 3, followed by convolutional operation with a kernel of size 1, and a batch normalization (BN) layer, a primary capsule layer comprising a set of primary Capsules, and a class capsule layer comprising a set of class capsules. Employing the deep feature based Capsule Network for the task comprises passing, successively through each of the set of feature extraction units, an input data to obtain set of input feature vectors, performing, by the primary capsule layer, a convolution of the set of input feature vectors into the set of primary capsules, wherein the set of primary capsules in the primary capsule layer comprises an optical number of capsules based on a number of deep features in the set of deep features; and predicting, at the class capsule layer, a set of classes from the set of input feature vectors, wherein a number of capsules in the set of class capsules is equal to a number of classes associated with the task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
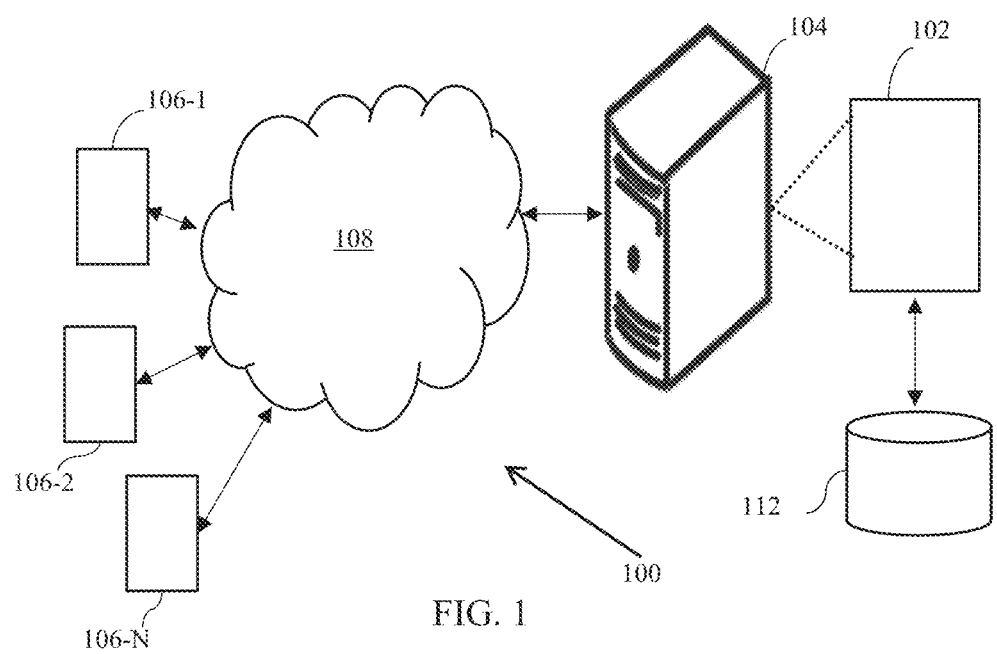
FIG. 1 illustrates an example network implementation of a system for parameter compression of a deep feature based capsule network, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The capsule network is a deep neural network that includes multiple capsules, where each capsule is a set of neurons whose activity vector represents the instantiation parameters of a specific type of entity such as an object or an object part in an image. The capsule networks learn to predict the objects in the image by trying to reconstruct the object it detects and comparing it to labelled examples from a training data.

The capsule network is shown to provide good results for image classification, with high recognition accuracy on MNIST dataset. Some of the other advantages of capsule networks are that it needs lesser amount of training data than CNNs and also provides information about pose and related parameters to identify the entities. The capsule network is also shown to be robust to input data transformations and "white box attacks. However, there are some important areas pertaining to the capsule networks where more attention is needed. For example, the training process of the existing capsule network is very slow due to inner loop and high computational requirement as it employs large number of parameters to retain learning, which restricts the network from using it for wider and more complex applications.

In a known technique, Expectation-Maximization (EM) is used for establishing the routing within the capsule blocks. The technique solves the performance of capsules while dealing with viewpoint variation and use a 4×4 matrix, to capture and learn the pose information. In another known technique, superior performance is demonstrated with small-NORB dataset. In still another work, impact of performance was determined by stacking more number of capsules or convolutional layers. Another known technique used modification in the capsule routing method to solve the challenge of Visual tracking where feature experiences drift. Yet another known method utilized multiscale feature extraction with hierarchy of feature, however, the said method doesn't provide compression at parameter level. Another method introduced spectral capsule network for faster conversion in comparison with EM routing capsules. The proficiency of capsules is also explored in GAN based architecture, where GAN is applied over capsule networks to have better character recognition results on both MNIST and CIFAR10 datasets. A sparsified form of the last capsule layer in a capsule network architecture was used in a known technique for unsupervised learning approach. Few more known methods employed capsule networks in different applications, including, for instance, video classification, object localization, and face verification. In another known method, an architecturally similar model was disclosed to be applied to text recognition for industrial applications. However, the number of parameters used in that architecture was much higher than the proposed approach. Moreover, the approach was focused on a specific industrial application and no experimental or ablation studies were made for the choice of the parameters used in that work. In contrast to all these aforesaid approaches, the present disclosure introduces a generic deep framework for both object and character recognition using convolutional feature blocks along-with a scaled down version of capsule networks. The model is demonstrated to be performing significantly better than the state-of-the art capsule networks, both in terms of recognition accuracy and computational complexity when applied to different datasets.

Various embodiments disclosed herein provides method and system that deep learning framework based on capsule networks which is compact and yet efficient as compared to the existing deep learning frameworks. Herein, the disclosed capsule network is referred to as 'compact' since the disclosed system is capable of compressing the number of parameters to almost around sixty percent as compared to the parameters required by the conventional capsule network. In an embodiment, the disclosed system employs a capsule network having a feature extraction layer having multiple feature extraction blocks prior to the capsule layer. The feature extraction layer includes a set of feature extraction units such that each feature extraction unit includes 3×3 convolutional kernel followed by 1×1 convolutional kernel and a batch normalization (BN) layer. Herein, introducing the aforementioned feature extraction layer prior to the capsule layer results in deeper (or better represented) deep features to the capsule layer, thereby improving recognition performance even with lesser number of capsules, and thus making the capsule network computationally efficient. These are other features of the disclosed system and method are described further in detail with reference to various embodiments described in FIGS. 1-6 below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 7H, where similar reference characters denote corresponding features consistently throughout the figures, there are shown preferred embodiments and these embodiments are described in the context of the following exemplary system and/or method.

FIG. 1 illustrates an example network implementation 100 of a system 102 for parameter compression of a capsule network in accordance with an example embodiment. In an embodiment, the disclosed system facilitates in implementing a feature extraction layer prior to a Capsule layer of the capsule network, thereby enabling in extracting deep features from an input data. In deep learning, the term 'deep features' refers to consistent response of a node or a layer within a hierarchical model to an input that gives a response that's relevant to the model's final output. A feature may be considered "deeper" than another feature depending on how early in the decision tree or other framework the response is activated. The current embodiments leverage the feature extraction ability of a CNN on an image by the use of a series of convolution operation done using feature extraction blocks, to obtain output features that can be fed to the capsule network architecture for solving difficult computer vision tasks. The series of convolution uses a convolutional kernel with a predetermined depth (i.e. one of 256 and 128), each kernel represents single neuron, a fundamental unit defined in the artificial neural network paradigm. By the use of these sequence of neurons when an input image data passes using the feature block, generates certain feature and called deep features.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2, . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2:
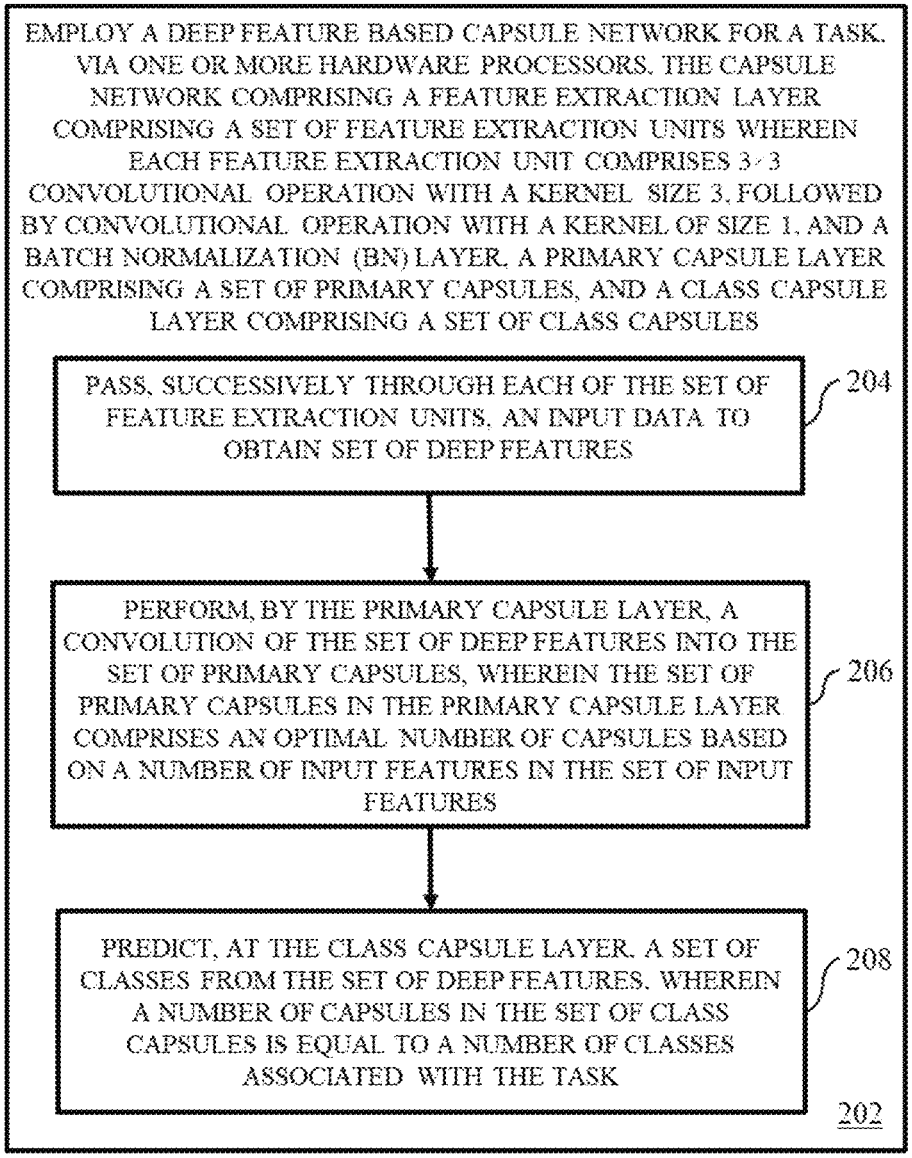
FIG. 2 illustrate a flow diagram or a method for parameter compression of a capsule network, in accordance with an example embodiment of the present disclosure.
Figure 3:
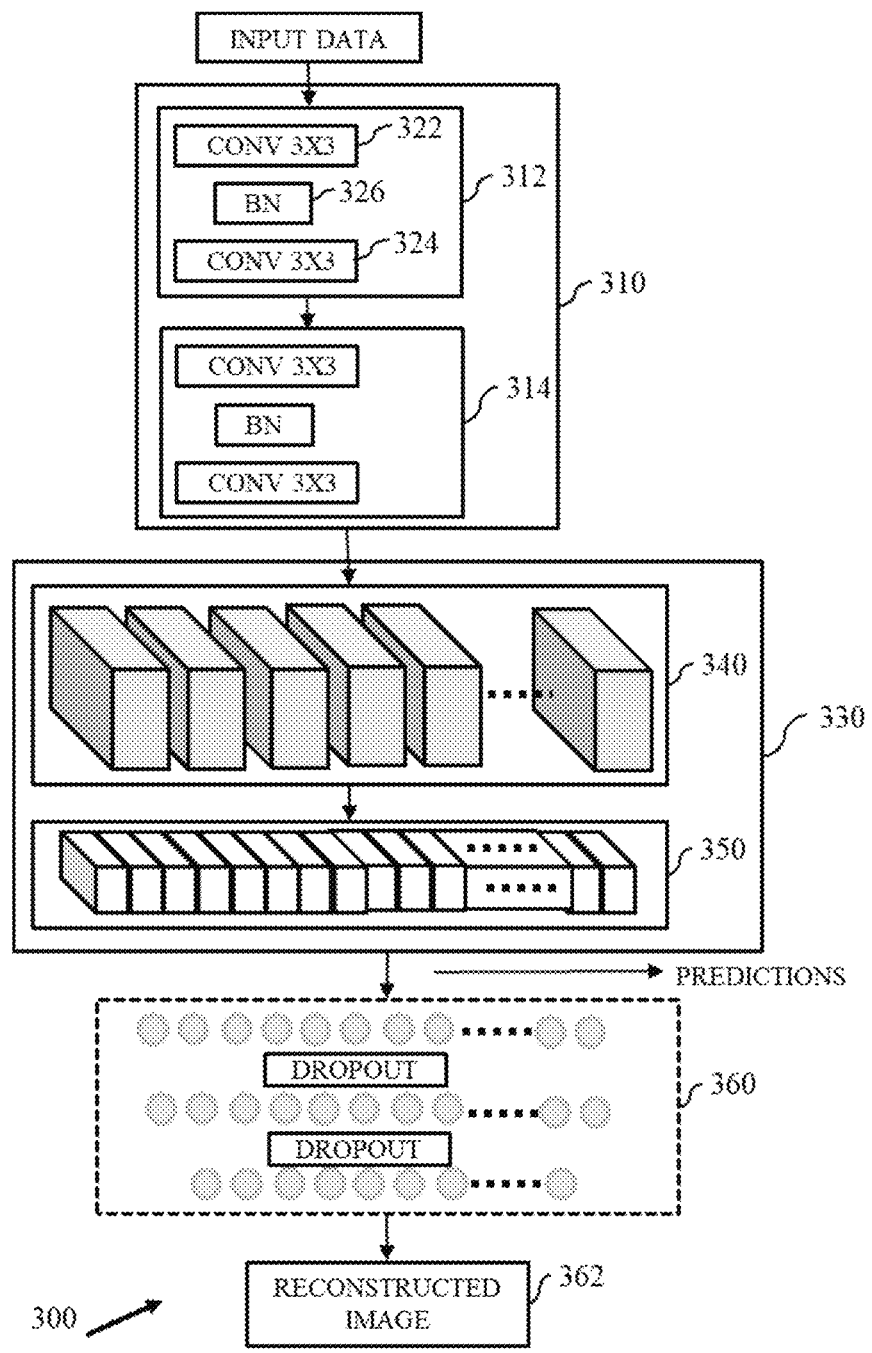
FIG. 3 illustrates an example block diagram of a parameter compression of a capsule network, in accordance with an example embodiment of the present disclosure.
Figure 4:
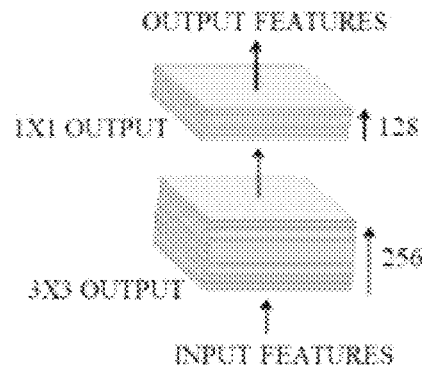
FIG. 4 illustrates an example representation of a feature block of the disclosed deep feature based capsule network of FIG. 3, in accordance with an example embodiment of the present disclosure.
Figure 5:
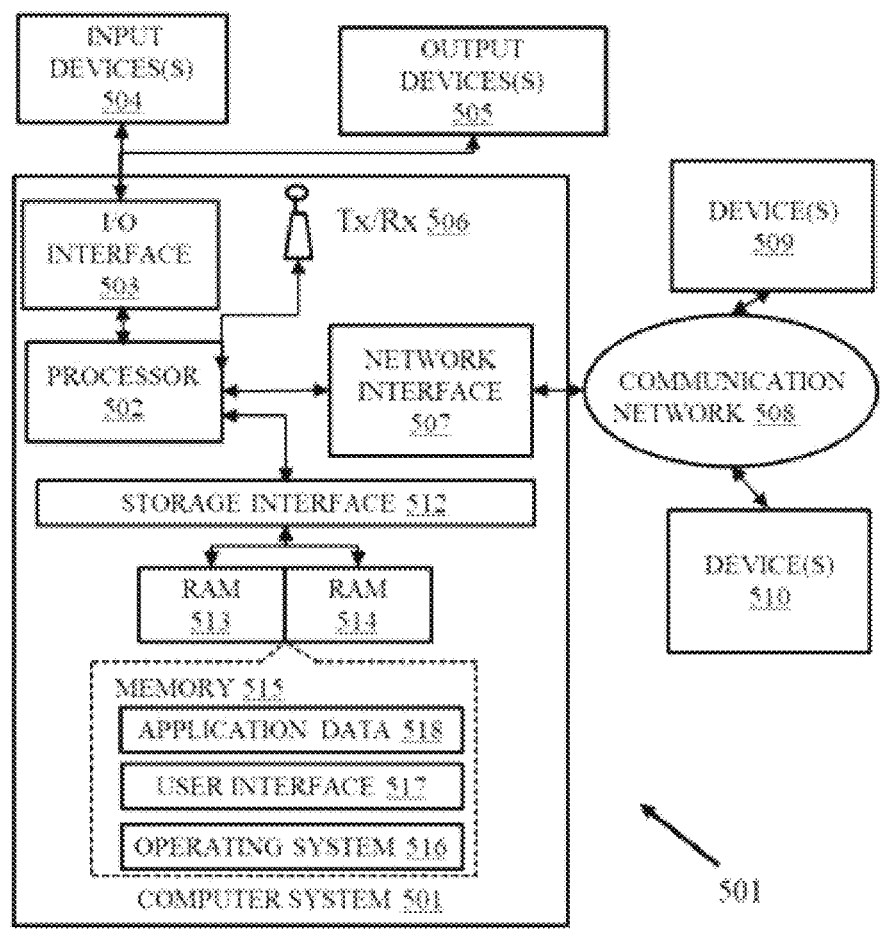
FIG. 5 illustrates a block diagram of an exemplary computer system for implementing embodiments consistent with the present disclosure.

Referring collectively to FIGS. 2-5, components and functionalities of the system 102 for parameter compression of a capsule network using deep features is described in accordance with an example embodiment. For example, FIG. 2 illustrate a flow diagram for a method for parameter compression of a capsule network, in accordance with an example embodiment of the present disclosure. FIG. 3 illustrates an example block diagram of a parameter compression of a capsule network, in accordance with an example embodiment of the present disclosure. FIG. 4 illustrates an example representation of a feature block of the disclosed deep feature based capsule network of FIG. 3, in accordance with an example embodiment of the present disclosure. FIG. 5 illustrates a block diagram of an exemplary computer system for implementing embodiments consistent with the present disclosure.

In various embodiments described herein, the disclosed deep feature based capsule network is capable of extracting deep features and using said deep features for convolution operation and prediction. Due to extraction of deep features, the number of parameters at the capsule network are compressed or scaled down (as compared to the number of parameters associated with typical capsule networks), thereby facilitating in learning efficient routing between the capsules during the training process. As is understood, the routing between the capsules in a capsule network refers to connecting capsules in consecutive layers to enable upper-level capsules to learn higher-level concepts by combining the concepts of the lower-level capsules. The method for parameter compression using the deep feature based capsule network is described further in detail below with reference to 202-208.

At 202 of method 200, a deep feature based Capsule Network is employed for a task, via one or more hardware processors. Herein, the task may be a computer/machine vision task. Examples of computer/machine vision task may include but are not limited to, object classification, image classification, semantic segmentation, pose estimation, image style transfer, image super resolution, and so on. The aforementioned examples are given for illustrative purposes, and hence should not be construed as limiting. It should be understood that the disclosed deep feature based capsule can be employed for any task that a typical capsule network is capable of doing, so as to compress the parameters of the capsule network and provide better recommendation with comparatively lesser number of capsules in the capsule layer.

The disclosed deep feature based Capsule Network is illustrated further with reference to FIG. 3. Referring to FIG. 3, an architecture block diagram of the deep feature based Capsule Network 300 is illustrated, in accordance with an example embodiment. The disclosed deep feature based Capsule Network 300 includes a feature extraction layer 310 comprising a set of feature extraction units such as 312, 314 and a capsule layer 330. Each feature extraction unit (such as feature extraction unit 312, 314) includes a convolutional operation with a kernel size 3, followed by convolutional operation with a kernel size 1, and a batch normalization (BN) layer. For example, the feature extraction unit 312 includes a convolutional operation with a kernel size 3 (marked at 322 in FIG. 3), followed by convolutional operation with a kernel size 1 (marker at 324 in FIG. 3), and a BN layer 326. The capsule layer 330 includes a primary capsule layer 340 comprising a set of primary Capsules, and a class capsule layer 350 comprising a set of class capsules. The method of employing the deep feature based capsule network 300 is described further in conjunction with 204-208 of FIG. 2.

At 204, the method 200 includes passing, successively through each of the set of feature extraction units, an input data to obtain set of input feature vectors. Herein the input data may be associated with the task. For instance, for training the deep feature based capsule network on text detection, the input data may include multiple images of various types of text. Such objects (or text) may belong to certain classes. For example, in case the task is text detection pertaining to detection of numerals in the images, the number of classes for said task may be 10 (corresponding to numerals 0, 1 2, . . . , 9).

The feature extraction blocks 312, 314 present prior to the capsule layer 330 in the disclosed feature based capsule network 300 facilitates in extraction of deep and comprehensive features (hereinafter referred to as 'deep features') due to the configuration of the feature blocks, for example the feature blocks 312, 314. For example, the feature block 312 is comprised of alternate convolutional layers with 512 filters having kernel size 3×3 and 256 filters with kernel size 1×1, respectively. The convolutional layer 322 having kernel size 1×1 within the feature block 312 facilitates in reducing the computational complexity of the disclosed deep feature based capsule network 300. The feature block 312 is illustrated detail in FIG. 4. In the present embodiment, the feature block, as shown in FIG. 4 is comprised of alternate convolutional layers with 256 filters having kernel size 3×3 and 128 filters with kernel size 1×1, respectively. Such deep and comprehensive features when subjected to the capsule layer, learn better routing between the capsules during the training process.

Referring back to FIG. 2, at 206, the method 200 includes performing, by the primary capsule layer, a convolution of the set of input feature vectors into the set of primary capsules, wherein the set of primary capsules in the primary capsule layer comprises an optimal number of capsules based on a number of features in the set of deep features.

Based on the input image features (or a set of deep features) obtained from a last feature block from amongst the set of feature blocks (in the feature extraction layer) and on performance aspect, the minimum possible number of capsules utilized in the primary capsule layer for the purpose of convolution of the set of deep features. Said minimum of the capsules are herein referred to as the 'optimal number of primary capsules'. The terminology 'optimal' herein is representative of the fact that the same task can be done by using more number of such capsules in the primary capsule layer but that may not provide a performance improvement, on the contrary, may increase the complexity of the Capsule network in term of parameters. However, if a fewer number of capsules (than the optimal number of capsules) are used, then it may lead to performance issues. Since, most of the parameters (that are used in the deep feature based capsule network 300) are used in the primary capsule layer, hence, finding the optimal number of capsules is key to parameter compression. In an embodiment, the optimal number of capsules is based on a number of deep features in the set of deep features and includes a minimum number of capsules satisfying a performance criteria and a parameter complexity criteria associated with the task. Herein, the performance criteria is indicative of a performance expectation of the deep feature based Capsule Network, and the parameter complexity criteria is indicative of complexity of parameters associated with the task. Herein, the set of deep features facilitates in parameter compression in the capsule layer.

The primary capsules layer 340 including the set of primary capsule blocks performs convolution and bundles the input deep features into the fixed optimal number of capsules. Since, the primary capsule layer 340 defines the representation of initial deep features in the form of vectors, which are trained to learn the geometric transformations in the routing-by-agreement training process, the deeper convolution features help in lowering the number of capsules (equal to the optimal number of capsules) relative to the number of capsules in conventional capsule networks for optimum learning. Said lowering of the number of capsules (or use of optimum number of capsules) required for optimum learning leads to parameter compression of the capsule network. The choice of deeper features eases the requirement of large number of initial capsules which leads to the drastic decrease in the total number of parameters. With deeper input feature, the performance is retained while decreasing the primary capsules shape from, for example, (32, 8) in a conventional capsule network to (20, 16) and finally to (20, 8) in the disclosed deep feature capsule network architecture 300. Moreover, these combinations have reduced the number of parameters up to 40% from the conventional capsule networks. The routing-by-agreement training process is described below.

As is understood, each capsule in the primary capsule layer is comprised of many neurons and deals with data in vector form. The reason as why the capsule is able to preserve spatial relationships between features is its ability to forward pass information between capsules using dynamic routing. As the output of each capsule layer is in vector form, use of a sigmoid, softmax or other activation function doesn't work. Hence, a non-linear activation function called squashing is utilized. For an input vector $s_j$ to the capsule j, the output vector $v_j$ is given as, $$v_j = \frac{\|s_j\|^2}{(1 + \|s_j\|^2)} \frac{s_j}{\|s_j\|} \quad (1)$$

where, $s_j$ denotes input vector to the capsule j in the class block. The output vector $v_j$ decides the probability of that special feature learned by the capsule. Considering that the $i^{th}$ capsule of the primary capsule block is connected to the $j^{th}$ capsule in the class capsule block, $s_j$ is given as:

$$s_j = \Sigma c_{ij} \hat{u}_{j|i}, \hat{u}_{j|i} w_{ij} u_i \quad (2)$$

where, $w_{ij}$ is the weight matrix that introduces geometric transformations between capsules of the two blocks and $u_i$ is the input vector of the $i^{th}$ capsule from the primary capsule block. $c_{ij}$ is the coupling coefficient which is determined by the iterative dynamic routing algorithm.

The coupling coefficient $c_{ij}$ is a routing softmax value obtained from all the originating link value of this capsule I to all the capsules in the class capsule block. The originating link values kept on updating with each iteration during the dynamic routing process. The total number of iterations in the routing process is used as two. The information in the primary capsule passes to the class capsule only for those features, where both contributed to the final prediction of the class in the past, otherwise it does not pass. This is known as routing-by-agreement.

At 206, the method 200 includes predicting, at the class capsule layer, a set of classes from the set of input feature vectors. The class capsule block layer is the final layer of the disclosed deep feature capsule network and includes a set of class capsules. The number of capsules in the set of class capsules is equal to a total number of classes present in the deep feature based capsule network 300, and such classes depends to the task. Each capsule in the class capsule layer block is responsible for the prediction of a single class and gets activated only for those primary block capsules which together agrees for the required class during training by dynamic routing method. The used number of capsules used in the class capsule layer is equal to the number of classes present and/or required in the task. Each capsule in this layer is comprised of a 1-D array with a dimension of 16.

In an embodiment, wherein the task is object classification in images, the system architecture of the deep feature based capsule network 300 further includes a decoder, for example a decoder 360 communicatively coupled with the class capsule layer 350. The decoder 360 is capable of receiving the set of classes predicted by the class capsule layer 350 and reconstructing an image, for example, a reconstructed image 362 associated with the task based on the set of classes.

The main objective of the decoder is to reconstruct an image and use it to find the mean squared error by comparing it with the input image. The reconstruction is done by taking input from the class capsule block which is then passed through 3 fully connected (FC) layers. The first two layers of the decoder block has 1024 and 512 nodes with Relu activation function. However, the last FC layer consists of nodes equal to the total pixels in the input image. The sigmoid activation function is used for the last FC layer and the output is reshaped to input image dimension. The loss calculation is explained further in detail below.

Two different types of losses are used during the training process: Margin loss and reconstruction or decoder loss. Margin loss is given as:

$$L_k = T_k \max(0, m^+ - \|v\|^2) + \lambda(1 - T_k)\max(0, \|v\| - m^-)^2 \quad (3)$$

where, $$T_k = \begin{cases} 1, & \text{For class } k \\ 0, & \text{For other classes} \end{cases}$$

$m^+ = 0.9, m^- = 0.9,$ $\lambda = 0.5$ and $\|v\|$ is output of the $k^{th}$ capsule.

The parameter $\lambda$ is used to decrease the weightage of other classes during margin loss calculation. The total loss is calculated by the sum of all the class capsules.

Except the activity vector of the correct class capsule, rest of the vectors are masked out during training process. The reconstruction loss is mean squared error of the pixel-wise difference between the reconstructed image and the input image and provides necessary regularization during training.

In order to train the disclosed deep feature based Capsule network, the loss minimization is done using a weighted sum of margin loss and decoder loss. Lower weightage is given to the reconstruction loss in shaping the learning with a value of 0.392 against unit weightage to margin loss.

Herein, it will be understood that the deep feature based Capsule network is shown to include the decoder for the object classification task. However, in cases of tasks other than object classification that can be performed by the deep feature based Capsule network, the architecture may include other blocks and/or layers. An example computer system implementing disclosed embodiments is described further with reference to FIG. 5.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celero™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), highdefinition multimedia interface (HDMI), RF antennas, S-Video, VGA, IEEE 802.11a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 516, user interface application 517, user/application data 518 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 518, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

An example scenario depicting the results of parameter compression performed by the disclosed system 102 is described further with reference to FIGS. 6A-6B and 7A-7H.

Example Scenario:

As example scenario illustrating proficiency of the disclosed deep feature based capsule framework is described herein with reference to FIGS. 7A-7H. For the purpose of experiments, datasets of two different categories were used in experiment. These include object image datasets (FMNIST and CIFAR 10) and character image datasets (MNIST and SVHN). These datasets have different formats (RGB and GrayScale) and have sufficient variations in order to be able to generalize the proposed architecture. The detailed description for each of these datasets are given below:

Object image dataset: FMNIST dataset: This dataset has gray-scale images of size 28×28 pixels for 10 different types of fashion accessories ranging from T-shirt to Ankle-boots. This dataset has 60,000 training images and 10,000 testing images.

CIFAR 10 dataset: This dataset contains 10 real world object images of animals (bird, cat, deer, dog, frog, and horse) and vehicles (airplane, automobile, ship, and truck). The image format is RGB with size 32×32 Pixels. It consists of 50,000 training and 10,000 testing images.

Character Image Dataset

1) MNIST dataset: This is a standard dataset for handwritten digits (0-9) and contains gray-scale image of size 28×28 pixels. There are 60,000 images for training and 10,000 images for testing in this dataset.

2) SVHN dataset: SVHN is a big dataset for digits (0-9), and consists of images taken from Google street view. The dataset poses challenge of recognizing digits in natural scene image. The number of training images in this dataset is 73,257 while for testing it has 26,032 images. The image is in RGB format as evident for a natural scene image and has a size of 32×32 pixels.

An ablation study was performed for selection of lower kernel size, feature block architecture and optimum dimension of primary capsule layer. Experimental results obtained by varying kernel size of convolutional layers.

Following variations are made in the convolution kernels within the CapsNet as well as addition of extra convolution layers with 3 or 9 kernel size.
1) Network 1: Kernel size 9 in CapsNet is replaced with kernel size 3.
2) Network 2: 1 extra convolution of Kernel size 9 is added in CapsNet architecture. The number of filters used is 128.
3) Network 3: Kernel size 3 in-place of 9, is used in Network 2.

It was observed from the results as shown in the Table III, that if more convolutional layer with kernel size 3 is stacked, then the performance is improved. However, this also results in increase of total number of parameters. The reason for increase in parameter is not due to the parameters of convolution layer, rather the parameters used in the class capsule layer due to higher dimension output (receptive field) after a lower kernel size convolution operation. Therefore, a deeper architecture with 3×3 convolution (for example, the disclosed deep feature based capsule network 300 of FIG. 3) reduces the receptive field before capsule block (as incorporated/implemented in the disclosed deep feature based Capsule network 300).

TABLE III

Effect of performances in the capsule network for variations in the sizes of kernel used in convolution layer

| Network Architecture | FMNIST Accuracy | FMNIST Parameters | SVHN Accuracy | SVHN Parameters |
|---|---|---|---|---|
| CapsNet | 0.912 | 8215568 | 0.932 | 11749120 |
| Network 1 | 0.92 | 10040336 | 0.919 | 14028544 |
| Network 2 | 0.908 | 9548816 | 0.936 | 12406272 |
| Network 3 | 0.92 | 9637904 | 0.945 | 13459968 |

The ablation study was further performed for selection of feature block architecture and optimum dimension of primary capsule layer of the disclosed feature based capsule network (of FIG. 3), as described below.

Ablation Study for Selection of Feature Blocks

The Table I gives a comparative analysis of performance for different types of feature blocks when evaluated on the selected datasets. Herein, the network deep feature based capsule network may be embodied in four configurations of feature block, namely Feature Block Type I (FB1), Feature Block Type II (FB2), Feature Block Type III (FB3), and Feature Block Type IV (FB4), as described below:

Feature Block Type I (FB1): The input feature is obtained by passing successive layers of convolution. The Convolution kernel size is 9.

Figure 6A:
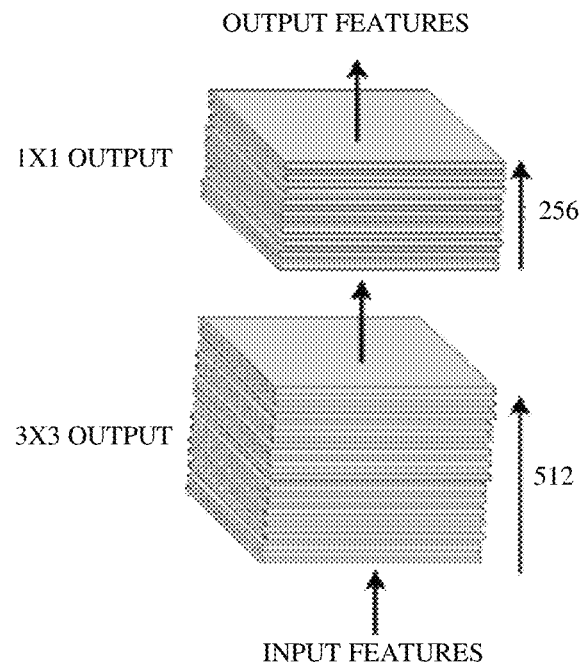
FIGS. 6A-6B illustrate example representations of feature block of the disclosed deep feature based capsule network of FIG. 3, in accordance with an example embodiment of the present disclosure.
Figure 6B:
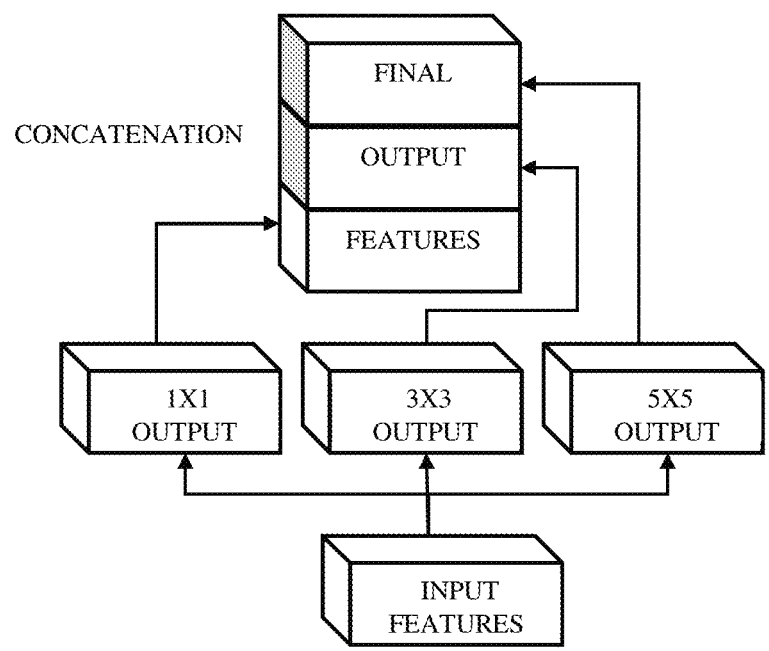
Figure 7A:
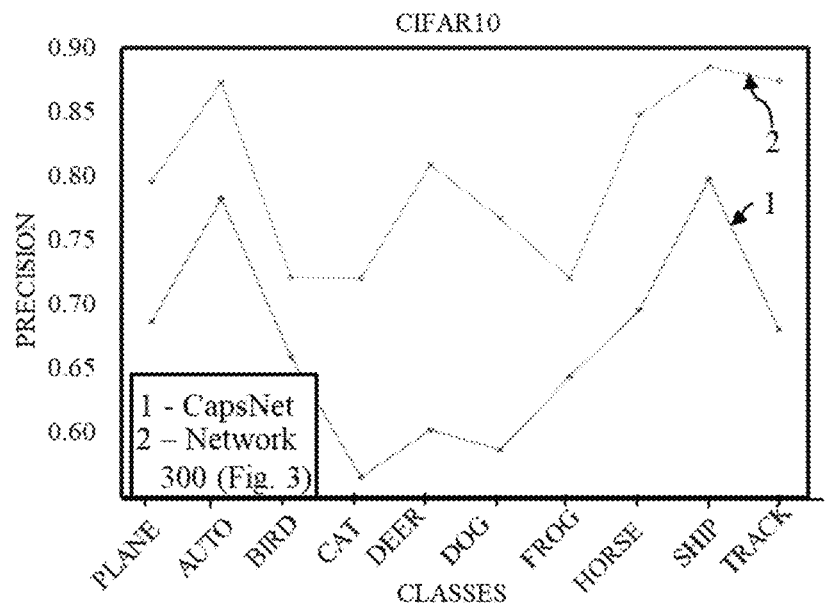
FIGS. 7A-7H illustrate performance improvement of the deep feature based capsule network on application of parameter compression facilitated by the disclosed deep feature based capsule network of FIGS. 1-6B, in accordance with an example embodiment.
Figure 7B:
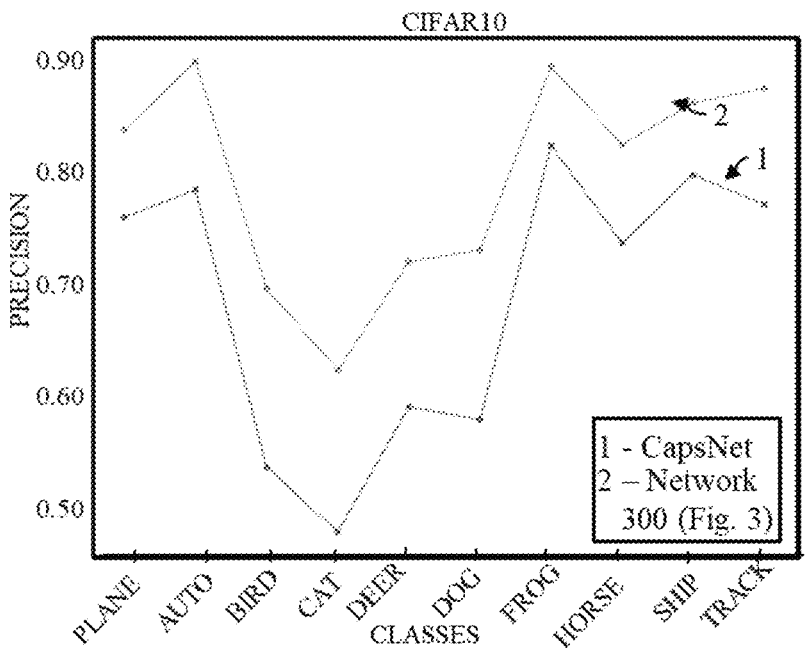
Figure 7C:
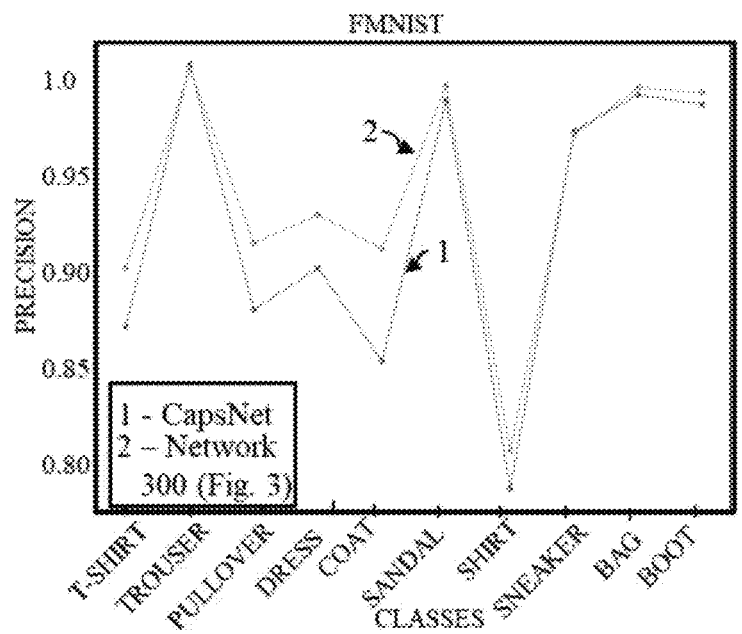
Figure 7D:
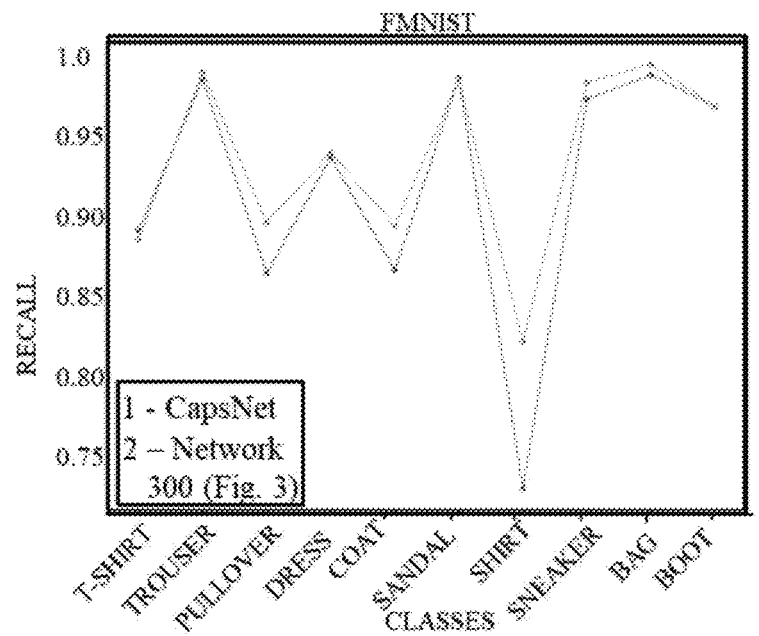
Figure 7E:
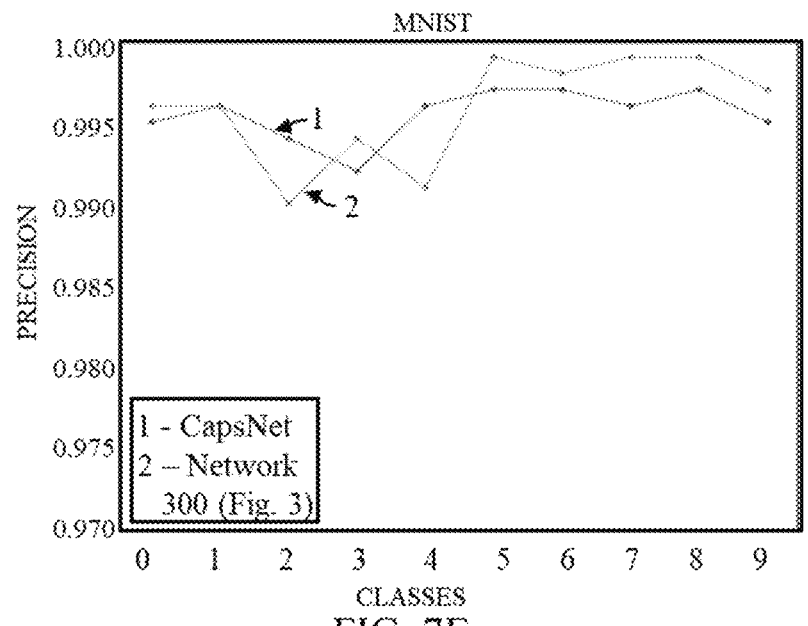
Figure 7F:
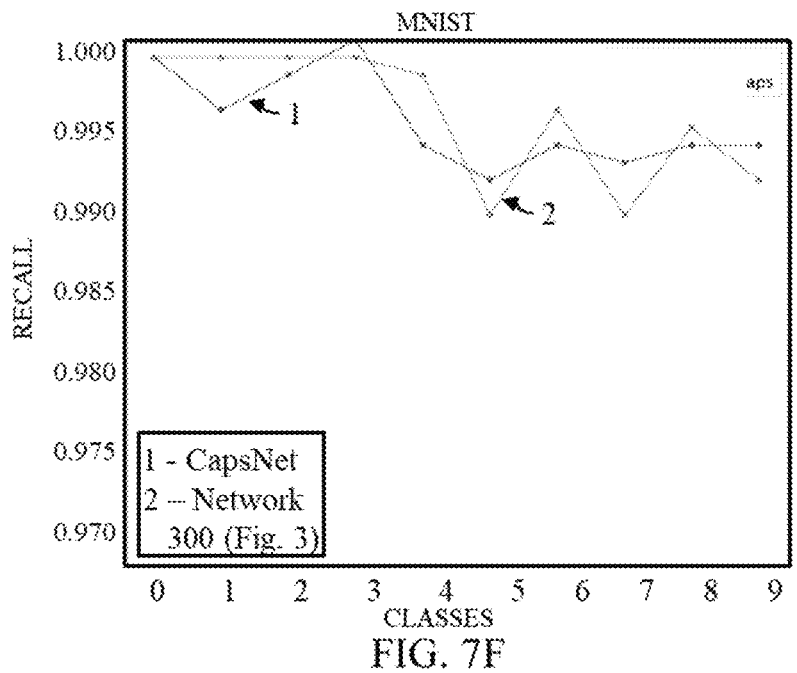
Figure 7G:
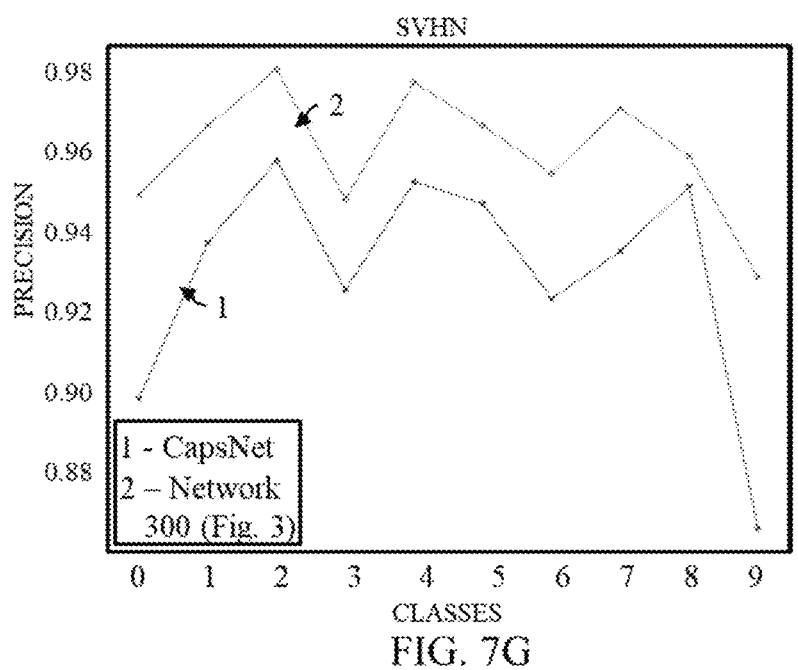
Figure 7H:
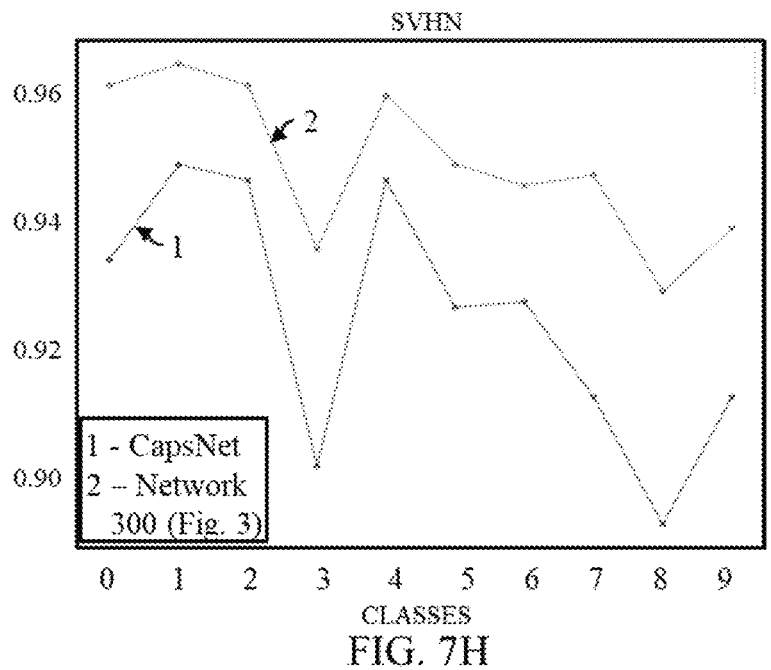

Feature Block Type II (FB2): The feature block, as shown in FIG. 6A is comprised of alternate convolutional layers with 512 filters having kernel size 3×3 and 256 filters with kernel size 1×1 respectively.

Feature Block Type III (FB3): The FB3, as shown in FIG. 4, is similar to type FB2, except that it has convolution kernels 3×3 and 1×1 with 256 and 128 filters respectively.

Feature Block Type IV (FB4): FB4 is shown in the FIG. 6B. The stacking of the convolution layers in this feature block is done similar to inception version 1.0, except the max pooling branch. In this feature block, parallel convolution operation with kernel sizes 5×5, 3×3 and 1×1 is applied followed by concatenation of these features. The concatenated features are then applied to the next feature block.

TABLE I

An ablation study for performance (both in terms of recognition accuracy and number of parameter used) analysis of the disclosed deep feature based Capsule network 300 (herein referred to as deep feature based capsule network) when different types of feature blocks.

| | | Feature | Number of | Accuracy | | | | Total parameters | |
|---|---|---|---|---|---|---|---|---|---|
| | | block | feature | Object dataset | | Character dataset | | RGB | Gray |
| SI # | Network name | type | blocks | CIFAR-10 | FMINST | SVHN | MINIST | image | Image |
| 1 | CapsNet | — | 0 | 0.676 | 0.912 | 0.93 | 0.996 | 11749120 | 8215568 |
| 2 | Deep feature based capsule network | I | 2 | 0.618 | 0.908 | 0.94 | 0995 | 12406272 | 9548816 |
| 3 | Deep feature | II | 4 | 0.745 | 0.924 | 0.96 | 0.996 | 18154304 | 14575696 |
| 4 | based capsule | | 3 | 0.784 | 0.926 | 0.96 | 0.996 | 17610816 | 13827408 |
| 5 | network | | 2 | 0.805 | 0.932 | 0.96 | 0.997 | 17169728 | 13181520 |
| 6 | Deep feature | III | 4 | 0.767 | 0.922 | 0.96 | 0.996 | 10899264 | 7322960 |
| 7 | based capsule | | 3 | 0.786 | 0.925 | 0.96 | 0.996 | 11339200 | 7558096 |

TABLE I-continued

An ablation study for performance (both in terms of recognition accuracy and number of parameter used) analysis of the disclosed deep feature based Capsule network 300 (herein referred to as deep feature based capsule network) when different types of feature blocks.

| SI # | Network name | Feature block type | Number of feature blocks | Accuracy Object dataset | | Accuracy Character dataset | | Total parameters RGB image | Total parameters Gray Image |
|---|---|---|---|---|---|---|---|---|---|
| | | | | CIFAR-10 | FMINIST | SVHN | MNIST | | |
| 8 | network | | 2 | 0.815 | 0.927 | 0.96 | 0.996 | 11881536 | 7895632 |
| 9 | Deep feature based capsule network | IV | 1 | 0.77 | 0.93 | 0.93 | 0.994 | 16070464 | 10853584 |

TABLE II

An ablation study to demonstrate the network parameter variation with different shape of initial capsules. The feature block type FB3/Type III is found to be outperforming all other configurations as shown in Table I.

| SI # | Network Name | Feature Block type | Number of feature blocks | Accuracy Object dataset | | Accuracy Character dataset | | Total parameters RGB image | Total parameters Gray Image |
|---|---|---|---|---|---|---|---|---|---|
| | | | | CIFAR-10 | FMNIST | SVHN | MNIST | | |
| Primarycapsule Block Parameters: No. of Capsule = 20 ; Dimension = 16 | | | | | | | | | |
| 1 | Disclosed n/w | III | 4 | 0.767 | 0.922 | 0.961 | 1 | 10899264 | 7322960 |
| 2 | | | 3 | 0.786 | 0.925 | 0.961 | 1 | 11339200 | 7558096 |
| 3 | | | 2 | 0.815 | 0.927 | 0.958 | 1 | 11881536 | 7895632 |
| Primarycapsule Block Parameters: No. of Capsule = 20; Dimension = 8 | | | | | | | | | |
| 4 | Disclosed n/w | III | 4 | 0.765 | 0.923 | 0.96 | 1 | 7985824 | 5023920 |
| 5 | | | 3 | 0.79 | 0.925 | 0.959 | 1 | 8041760 | 4977456 |
| 6 | | | 2 | 0.807 | 0.93 | 0.96 | 1 | 8148896 | 4982192 |
| Primerycapsule Block Parameters: No. of Capsule = 32; Dimension = 8 | | | | | | | | | |
| 7 | Disclosed n/w | III | 4 | 0.774 | 0.923 | 0.959 | 1 | 9733888 | 6403344 |
| 8 | | | 3 | 0.796 | 0.927 | 0.963 | 1 | 10020224 | 6525840 |
| 9 | | | 2 | 0.803 | 0.926 | 0.959 | 1 | 10388480 | 6730256 |

In all these cases, the disclosed deep feature based capsule network architecture with primary capsule block parameters having 20 capsules and dimension of each as 16 are used. Both recognition accuracies and well as total number of parameters are considered while making a comparative study. It can be observed from the analysis that, the proposed deep feature framework using type-III feature block outperforms all other frameworks, both in terms of recognition accuracy and number of parameters used. The observations show that best performance is obtained using proposed deep features when the dimension of capsules in the primary block is set to 8. It must be noted that, the number of capsules in the primary capsule block is set to 20 for the ablation study to select best feature block as depicted in FIG. 3.

Based on studies performed as shown in Table I and Table II, it can be concluded that, the proposed deep feature based Capsule network, 300 is significantly better than capsule network, both in terms of recognition accuracy as well as number of parameters used. From this ablation study, the best architecture we propose here is deep feature based Capsule network 300 of 2 FB3 feature blocks. FIG. 6 shows a performance comparison (in terms of precision and recall) between the deep feature based Capsule network, 300 and CapsNet for 10 different classes of images for object image dataset and character image dataset. Again, the deep feature based Capsule network 300 outperforms the original Caps-Net.

To compress the network, dimension of the capsules in the primary capsule block is reduced. Table II shows this ablation study, where performance is tabulate with change in capsule dimension. Here, it has been shown that the parameter is reduced for an RGB image from 11749120 to 8148896 while for gray scale image it is reduced from 8215568 to 4982192. So, deep feature based Capsule network 300 architecture is compressed to 69% and 60% of CapsNet architecture for RGB and Gray scale images respectively. It is to note here that in Table II, row 5, 6, 7 the number of parameter is decreased with increase in feature blocks, the reason for this is, the most number of parameter is used in the capsule block in comparison with feature blocks. Since, increasing feature block, the receptive fields decreases as a result parameters in the capsule layer decreases accordingly. Architecture with FB3, for 3 and 4 Feature Blocks parameter is low still the performance is better with 2 Feature Block so we choose it as our proposed network architecture.

The result of performance analysis after applying Batch Normalization is shown in Table V. Table V shows the results obtained after using batch normalization layer in the disclosed deep feature based network architecture of 2 FB3 blocks (which is also selected as the best architecture based on the analysis made in the Table III. Results clearly show that use of a Batch Normalization layer allows the Capsule Network to train faster and also ensures increase in recognition accuracy.

TABLE V

Performance comparison after using Batch Normalization

| SI no. | Network name | SVHN Accuracy | SVHN Epoch | MNIST Accuracy | MNIST Epoch | CIFAR-10 Accuracy | CIFAR-10 Epoch | FMNIST Accuracy | FMNIST Epoch |
|---|---|---|---|---|---|---|---|---|---|
| 1 | CapsNet | 0.932 | 50 | 0.996 | 27 | 0.676 | 61 | 0.912 | 50 |
| 2 | Deep Feature based capsule network | 0.96 | 31 | 0.996 | 14 | 0.807 | 39 | 0.93 | 28 |
| 3 | Deep Feature based capsule network with BN | 0.96 | 30 | 0.996 | 13 | 0.83 | 30 | 0.928 | 21 |

The hyper-parameter tuning for training of the deep feature based CapsNet was performed. Firstly, the performances are checked for different routing values (2, 3, 4 and 5) for the dynamic routing process. It is observed that changes in performance are negligible for the routing number variations. However, performance is achieved with routing value 2 as shown in Table IV. Thus, the value was set as 2 for the experiments. Secondly, the weightage of the regularization parameter (reconstruction loss) was varied in total loss. The variations are made within the range of 0.2 to 0.5. It was observed, that the best performance is obtained when it is set to 0.392.

TABLE IV

Performance comparison for optimum number of routing. Table shows Routing results in Proposed Deep feature based capsule network (FB Type: III, No of FB: 2, Primary Caps: 20, Dimension:8).

| SI no. | Number of Routing | Dataset Performance (Accuracy) | | | |
|---|---|---|---|---|---|
| | | CIFAR10 | FMNIST | SVHN | MNIST |
| 1 | 2 | 0.803 | 0.93 | 0.956 | 0.996 |
| 2 | 3 | 0.807 | 0.93 | 0.96 | 0.996 |
| 3 | 4 | 0.809 | 0.932 | 0.953 | 0.996 |
| 4 | 5 | 0.818 | 0.932 | 0.956 | 0.996 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for compressing parameters of a capsule network based on deep features. In an embodiment, the system includes an architecture of the deep feature based capsule network such that the capsule layer is preceded by feature blocks. Said feature blocks comprises convolutional operation with a kernel size 3, followed by convolutional operation with a kernel of size 1, and a Batch Normalization layer, and hence are able to extract deep features. These deep features when input to the capsule layer facilitates in compressing the parameters of the capsule layer to almost 60% of the total parameters used in the state-of-the-art capsule network, while ensuring a significant increase in recognition accuracy.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
employing a deep feature based Capsule Network for a task, via one or more hardware processors, the employed deep feature based Capsule Network is a deep neural network including one or more capsules, each capsule of the one or more capsules is a set of neurons of the deep feature based Capsule Network, the deep feature based Capsule Network comprising:
a feature extraction layer comprising a set of feature extraction units, wherein each feature extraction unit of the set of feature extraction units comprises:
alternate convolutional layers with 512 filters having kernal size 3×3 and 256 filters with kernal size 1×1 respectively, and
a batch normalization (BN) layer, and
a capsule layer that includes:
a primary capsule layer comprising a set of primary Capsules for defining representation of initial deep features in form of vectors that are trained to learn geometric transformations in a routing-by-agreement process, wherein the primary capsule layer comprises a plurality of neurons of the deep feature based Capsule Network, and
a class capsule layer comprising a set of class capsules, wherein the routing-by-agreement process comprises passing information from each of the set of primary capsules to each capsule in the set of class capsules only for features that contributed to prediction of at least one class in the past, and refrains from passing the information from each of the set of primary capsules to each capsule in the set of class capsules for features that did not contribute to prediction of at least one class in the past,
wherein the feature extraction layer is prior to the capsule layer, the feature extraction layer configured to extract the deep features from input data,
wherein employing the deep feature based Capsule Network comprises:
passing, successively through each of the set of feature extraction units, an input data to obtain a set of deep features;
performing, by the primary capsule layer, a convolution of the set of deep features into the set of primary capsules, wherein the set of primary capsules in the primary capsule layer comprises an optimal number of capsules based on a number of features in the set of deep features; and
predicting, at the class capsule layer, a set of classes from the set of deep features, wherein each capsule in the set of class capsules predict a single class and is activated only for those primary block capsules which together agrees for a required class during a training phase of the deep feature based Capsule Network, wherein a number of capsules of the one or more capsules in the set of class capsules is equal to a number of classes associated with the task, and further receiving the set of classes predicted by the class capsule layer via a decoder and reconstructing an image associated with the task based on the set of classes during a training phase of the deep feature based Capsule Network.

2. The processor implemented method of claim 1, wherein the optimal number of capsules based on the number of deep features in the set of deep features comprises a minimum number of capsules satisfying a performance criteria and a parameter complexity criteria associated with the task, wherein the performance criteria is indicative of a performance expectation of the deep feature based Capsule Network, and wherein the parameter complexity criteria is indicative of complexity of parameters associated with the task, and wherein the set of deep features facilitates in parameter compression in the capsule layer.

3. The processor implemented method of claim 1, the number of capsules in the class capsule layer is equal to the number of classes associated with the task, and wherein each capsule in the class capsule layer comprises a 1-D array with a dimension of 16.

4. A system comprising:
one or more memories; and
one or more first hardware processors, the one or more first memories coupled to the one or more first hardware processors, wherein the one or more first hardware processors are configured to execute programmed instructions stored in the one or more first memories, to:
employ a deep feature based Capsule Network for a task, the employed deep feature based Capsule Network is a deep neural network including one or more capsules, each capsule of the one or more capsules is a set of neurons of the deep feature based Capsule Network, the deep feature based Capsule Network comprising a feature extraction layer comprising a set of feature extraction units, wherein each feature extraction unit of the set of feature extraction units comprises alternate convolutional layers with 512 filters having kernal size 3×3 and 256 filters with kernal size 1×1 respectively, and a batch normalization (BN) layer, a capsule layer that includes a primary capsule layer and a class capsule layer, the primary capsule layer comprising a set of primary Capsules to define representation of initial deep features in form of vectors that are trained to learn geometric transformations in a routing-by-agreement process, and the class capsule layer comprising a set of class capsules, the feature extraction layer is prior to the capsule layer, the feature extraction layer configured to extract the deep features from input data,
wherein the primary capsule layer comprises a plurality of neurons of the deep feature based Capsule Network,
wherein the routing-by-agreement process comprises passing information from each of the set of primary capsules to each capsule in the set of class capsules only for features that contributed to prediction of at least one class in the past, and refrains from passing the information from each of the set of primary capsules to each capsule in the set of class capsules for features that did not contribute to prediction of at least one class in the past,
wherein to employ the deep feature based Capsule Network for the task, the one or more first hardware processors are configured by the instructions to:
pass, successively through each of the set of feature extraction units, an input data to obtain set of deep features;
perform, by the primary capsule layer, a convolution of the set of deep features into the set of primary capsules, wherein the set of primary capsules in the primary capsule layer comprises an optimal number of capsules based on a number of features in the set of deep features; and predict, at the class capsule layer, a set of classes from the set of deep features, wherein each capsule in the set of class capsules predict a single class and is activated only for those primary block capsules which together agrees for a required class during a training phase of the deep feature based Capsule Network, wherein a number of capsules of the one or more capsules in the set of class capsules is equal to a number of classes associated with the task, and wherein the deep feature based Capsule Network further comprises a decoder communicatively coupled with the class capsule layer, the decoder capable of receiving the set of classes predicted by the class capsule layer and reconstructing an image associated with the task based on the set of classes during a training phase of the deep feature based Capsule Network.

5. The system of claim 4, wherein the optimal number of capsules based on a number of deep features in the set of deep features comprises a minimum number of capsules satisfying a performance criteria and a parameter complexity criteria associated with the task, wherein the performance criteria is indicative of a performance expectation of the deep feature based Capsule Network, and wherein the parameter complexity criteria is indicative of complexity of parameters associated with the task, and wherein the set of deep features facilitates in parameter compression in the capsule layer.

6. The system of claim 4, the number of capsules in the class capsule layer is equal to the number of classes associated with the task, and wherein each capsule in the class capsule layer comprises a 1-D array with a dimension of 16.

7. One or more non-transitory machine readable information storage mediums comprising one or more instructions which when executed by one or more hardware processors cause managing a plurality of events, the instructions cause:
  employing a deep feature based Capsule Network for a task, the employed deep feature based Capsule Network is a deep neural network including one or more capsules, each capsule of the one or more capsules is a set of neurons of the deep feature based Capsule Network, the deep feature based Capsule Network comprising:
    a feature extraction layer comprising a set of feature extraction units wherein each feature extraction unit of the set of feature extraction units comprises alternate convolutional layers with 512 filters having kernal size 3×3 and 256 filters with kernal size 1×1 respectively, and a batch normalization (BN) layer, and
  a capsule layer including: a primary capsule layer and a class capsule layer, the primary capsule layer comprising a set of primary Capsules for defining representation of initial deep features in form of vectors that are trained to learn geometric transformations in a routing-by-agreement process, wherein the primary capsule layer comprises a plurality of neurons of the deep feature based Capsule Network, and the class capsule layer comprising a set of class capsules, wherein the routing-by-agreement process comprises passing information from each of the set of primary capsules to each capsule in the set of class capsules only for features that contributed to prediction of at least one class in the past, and refrains from passing the information from each of the set of primary capsules to each capsule in the set of class capsules for features that did not contribute to prediction of at least one class in the past, wherein the feature extraction layer is prior to the capsule layer, the feature extraction layer configured to extract the deep features from input data, wherein employing the deep feature based Capsule Network comprises:

passing, successively through each of the set of feature extraction units, an input data to obtain a set of deep features;

performing, by the primary capsule layer, a convolution of the set of deep features into the set of primary capsules, wherein the set of primary capsules in the primary capsule layer comprises an optimal number of capsules based on a number of features in the set of deep features; and predicting, at the class capsule layer, a set of classes from the set of deep features, wherein each capsule in the set of class capsules predict a single class and is activated only for those primary block capsules which together agrees for a required class during a training phase of the deep feature based Capsule Network, wherein a number of capsules of the one or more capsules in the set of class capsules is equal to a number of classes associated with the task, and further receiving the set of classes predicted by the class capsule layer via a decoder and reconstructing an image associated with the task based on the set of classes during a training phase of the deep feature based Capsule Network.

* * * * *